(12) United States Patent
Zhu et al.

(10) Patent No.: US 9,175,223 B2
(45) Date of Patent: Nov. 3, 2015

(54) INTUMESCENT, HALOGEN-FREE, SILICON-PHOSPHORUS-NITROGEN BASED POLYMERIC FLAME RETARDANT

(75) Inventors: Journey L. Zhu, Shanghai (CN); Given Jing Chen, Shanghai (CN); Jinder Jow, Missouri City, TX (US); Kenny Chun Hui Su, Taiwan (CN); Ping Wei, Shanghai (CN); Chen Wang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 332 days.

(21) Appl. No.: 13/990,099

(22) PCT Filed: Dec. 2, 2010

(86) PCT No.: PCT/CN2010/079398
§ 371 (c)(1),
(2), (4) Date: May 29, 2013

(87) PCT Pub. No.: WO2012/071732
PCT Pub. Date: Jun. 7, 2012

(65) Prior Publication Data
US 2013/0248783 A1    Sep. 26, 2013

(51) Int. Cl.
*C09K 21/14*    (2006.01)
*C08G 77/62*    (2006.01)
*C08L 83/16*    (2006.01)
*C09D 5/18*    (2006.01)
*C09D 183/16*    (2006.01)
*H01B 7/295*    (2006.01)

(52) U.S. Cl.
CPC ............... *C09K 21/14* (2013.01); *C08G 77/62* (2013.01); *C08L 83/16* (2013.01); *C09D 5/185* (2013.01); *C09D 183/16* (2013.01); *H01B 7/295* (2013.01)

(58) Field of Classification Search
None
See application file for complete search history.

(56) References Cited

U.S. PATENT DOCUMENTS 3,296,189 A    1/1967    Eastman
3,299,187 A    1/1967    Ratz

FOREIGN PATENT DOCUMENTS

CN    101225310 A    7/2008
CN    101671568 A    3/2010
JP    2003171467 A    6/2003

*Primary Examiner* — Tanisha Diggs
(74) *Attorney, Agent, or Firm* — Whyte Hirschboeck Dudek S.C.

(57) ABSTRACT

This invention provides intumescent, halogen-free, polymeric, silicon-phosphorus-nitrogen (SPN) flame retardant, a process for their preparation, and systems, compositions and articles into which they are incorporated. The inventive intumescent, halogen-free, SPN polymer compositions afford good flame retardant performance at a lower loading compared to conventional phosphorus and nitrogen based intumescent flame retardant compositions.

18 Claims, 1 Drawing Sheet

INTUMESCENT, HALOGEN-FREE, SILICON-PHOSPHORUS-NITROGEN BASED POLYMERIC FLAME RETARDANT

CROSS REFERENCE TO RELATED APPLICATION

The present application is the national phase of PCT Patent Application No. PCT/CN2010/079398 filed Dec. 2, 2010, the entire content of which is incorporated by reference herein.

BACKGROUND OF THE INVENTION

1. Field of the Invention

This invention relates to intumescent, halogen-free, silicon-phosphorus-nitrogen (SPN) polymeric flame retardants, a process for their preparation, and compositions and articles into which they are incorporated.

2. Description of the Related Art

Due to the increasing concerns over the environment and fire safety, there has been an effort to develop halogen free flame retardants (HFFR) for use in various polymeric systems. Phosphorus and nitrogen based intumescent flame retardant (IFR) systems are widely used. However, by incorporation of high loadings of flame retardant (FR) into a polymer matrix, the properties of the polymer composition may be sacrificed, for example physical, electrical, or aging properties. Therefore, there is a demand to reduce the loadings of HFFR in the flame-retardant compositions while maintaining the properties of the polymer matrices. Sometimes, phosphorus and nitrogen based IFR at low molecular weights are used, but suffer from migration of the IFR.

SUMMARY OF THE INVENTION

In one embodiment the invention is an intumescent, halogen-free, silicon-phosphorus-nitrogen (IHFSPN) polymer of Formula (I)

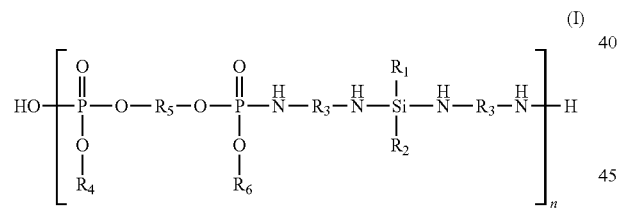

(I)

where $R_1$ through $R_6$ may be the same or different from each other, and each is: hydrogen, $C_1$-$C_5$ alkyl, $C_3$-$C_5$ hydroxyalkyl, $C_3$-$C_4$ alkenyl, $C_6$-$C_{10}$ aryl, $C_7$-$C_8$ arylalkyl, or a cycloalkyl structure (e.g., cyclohexyl), and "n" is 2 to 100 and typically 5 to 20.

In one embodiment, the invention is an IHFSPN polymer of Formula (II)

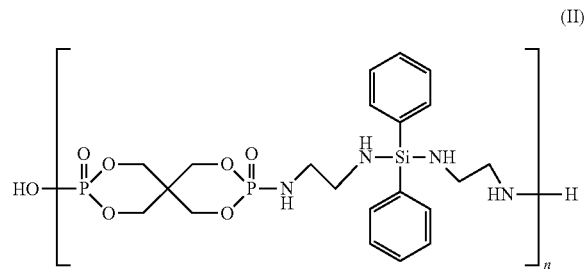

(II)

where "n" is 2-100 and typically 5-20.

In one embodiment, the invention is a flame retardant system comprising two or more IHFSPN polymers of Formula (I).

In one embodiment, the invention is a composition comprising one or more IHFSPN polymers of Formula (I) and a base polymer, where the base polymer is not a polymer of Formula (I).

In one embodiment, the invention is an article comprising an IHFSPN polymer of Formula (I). In one embodiment, the invention is an article comprising an IHFSPN polymer of Formula (II).

In one embodiment, the invention is a process of making an IHFSPN polymer of Formula (I), the process comprising the steps of:

(i) contacting at reaction conditions a dihalosilane and a diamine to produce a silanediyldiamine;

(ii) contacting at reaction conditions a dihalophosphate and a polydric alcohol to produce a spirodihalophosphate; and (iii) contacting at reaction conditions the silanediyldiamine and the spirodihalophosphate to produce a polymer Formula (I).

In one embodiment, the invention is a process of making an IHFSPN polymer of Formula (II), the process comprising the steps of:

(i) contacting at reaction conditions dichlorodiphenylsilane and ethane-1,2-diamine in the presence of triethylamine to produce N,N-(diphenylsilanediyl)diethane-1,2-diamine;

(ii) contacting at reaction conditions phosphoryl trichloride and pentaerythirtol to produce pentaerythritol-spirodichlorophosphate; and (iii) contacting at reaction conditions the N,N-(diphenylsilanediyl)diethane-1,2-diamine and the pentaerythritol-spirodichlorophosphate to produce a polymer of Formula (II).

The IHFSPN polymers of Formula (I) are useful as flame retardants in various flame retardant systems and polymeric compositions such as those used in the manufacture of wire and cable coating.

DETAILED DESCRIPTION OF THE PREFERRED EMBODIMENT

Figure 1:
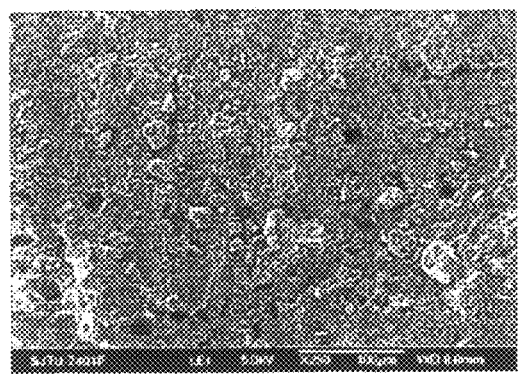
FIG. 1 is an SEM image of a Poly(ethylene-ethyl acrylate)/Ammonium polyphosphate (EEA/APP) composite.

This invention provides an intumescent, halogen-free (HF), polymeric, silicon-phosphorus-nitrogen (SPN) flame retardant, a process for its preparation, and articles, systems and compositions into which they are incorporated. The inventive intumescent, halogen-free, SPN polymer affords good FR performance at a lower loading compared to conventional phosphorus and nitrogen based intumescent flame retardant (IFR) compositions.

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of various components of the composition, the parameters of the process, and the like.

"Comprising", "including", "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition", "formulation" and like terms means a mixture or blend of two or more components. In the context of a mix or blend of materials from which a cable sheath or other article of manufacture is fabricated, the composition includes all the components of the mix, e.g., polypropylene, polyethylene co-polymer, metal hydrate and any other additives such as cure catalysts, antioxidants, flame retardants, etc.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a compound prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Thermoplastic" material means a linear or branched polymer which can be repeatedly softened and made flowable when heated and returned to a hard state when cooled to room temperature. It generally has an elastic modulus greater than 10,000 psi (68.95 MPa) using the method of ASTM D638-72. In addition, thermoplastics can be molded or extruded into articles of any predetermined shape when heated to the softened state.

"Cable," "power cable," and like terms means at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc., can be designed for low, medium and high voltage applications. Typical cable designs are illustrated in U.S. Pat. Nos. 5,246,783, 6,496,629 and 6,714,707.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of many products, e.g., a wire or cable covering, made from the compositions of this invention.

"Intumescent flame retardant" and like terms means a flame retardant that yields a foamed char formed on a surface of a polymeric material during fire exposure.

IHFSPN Polymer Flame Retardant Systems

A IHFSPN polymer flame retardant system of this invention comprises one or more IHFSPN polymers of Formula (I). The IHFSPN flame retardant system may include one or more other halogen-free flame retardants, not of Formula (I), such as ammonium polyphosphate (APP), red phosphorus, silica, alumina, titanium oxides, carbon nanotubes, talc, clay, organo-modified clay, silicone polymer, zinc borate, antimony trioxide, wollastonite, mica, hindered amine stabilizers, ammonium octamolybdate, melamine octamolybdate, fits, hollow glass microspheres, intumescent compounds, expandable graphite, ethylene diamine phosphate, melamine phosphate, melamine pyrophosphate, and melamine polyphosphate. The IHFSPN polymer flame retardant system may include fillers, antioxidants, pigments, UC stabilizers, process aids, tougheners, etc.

The IHFSPN polymer, or mixture of two or more IHFSPN polymers, comprises 50 or more weight percent of the IHFSPN polymer flame retardant system, typically 60 wt % or more, or 70 wt % or more, or 80 wt % or more, or 90 wt % or more. In one embodiment the IHFSPN polymer flame retardant system contains the IHFSPN polymer of Formula (II).

IHFSPN Polymer Compositions

The IHFSPN polymers are typically used in polymeric compositions as a flame retardant, but they can also be used in such compositions as a processing aid, crosslinker, or cure agent. For example, the IHFSPN polymer of Formula (I) can be used as a cure agent for a polymer with acid, acid anhydride or epoxy groups.

The compositions of this invention are typically prepared by blending an IHFSPN polymer with a base polymer. The base polymer is not a polymer of Formula (I), and representative base polymers include a polyolefin, polyurethane, polyester, polystyrene, polycarbonate, epoxy resins, and the like. Typically the base polymer may comprise at least one of an ethylene vinylacetate copolymer, a poly(ethylene-ethyl acrylate) copolymer, a thermoplastic polyurethane, a polyethylene and a polypropylene. The IHFSPN polymer composition may comprise 10 to 50 weight percent of a polymer of Formula (I) and 50 to 90 weight percent of the base polymer. More preferably, the IHFSPN polymer composition may comprise 25 to 30 weight percent of a polymer of Formula (I) and 70 to 75 weight percent of the base polymer of poly (ethylene-ethyl acrylate).

More specific examples of base polymers include polyolefins such as ethylene polymers (e.g., low density polyethylene (LDPE), ULDPE, medium density polyethylene (MDPE), LLDPE, HDPE, homogeneously branched linear ethylene polymer, substantially linear ethylene polymer, graft modified ethylene polymer ethylene-styrene interpolymer, ethylene vinyl acetate interpolymer, ethylene acrylic acid interpolymer, ethylene ethyl acetate interpolymer, ethylene methacrylic acid interpolymer, ethylene methacrylic acid ionomer, and the like), polycarbonate, polystyrene, conventional polypropylene (e.g., homopolymer polypropylene, polypropylene copolymer, random block polypropylene interpolymer and the like), thermoplastic polyurethane, polyamide, polylactic acid interpolymer, thermoplastic block polymer (e.g., styrene butadiene copolymer, styrene butadiene styrene triblock copolymer, styrene ethylene-butylene styrene triblock copolymer and the like), polyethyer block copolymer (e.g., PEBAX), copolyester polymer, polyester/polyether block polymers (e.g., HYTEL), ethylene carbon monoxide interpolymer (e.g., ethylene/carbon monoxide (ECO), copolymer, ethylene/acrylic acid/carbon monoxide (EAAVO) terpolymer, ethylene/methacrylic acid/carbon monoxide (EMAACO) terpolymer, ethylene/vinyl acetate/carbon monoxide (EVACO) terpolymer and styrene/carbon monoxide (SCO)), polyethylene terephthalate (PET), chlorinated polyethylene, and the like and mixtures there of. In other words, the polyolefin used in the practice of this invention can be a blend of two or more polyolefins, or a blend of one or more polyolefins with one or more polymers other than a polyolefin.

The IHFSPN polymer compositions may also include conventional additives, which can be introduced into the IHFSPN polymer compositions or directly into the IHFSPN polymer flame retardant system, exemplified by antioxidants, coupling agents, ultraviolet absorbers, stabilizers, antistatic agents, pigments, dyes, nucleating agents, reinforcing fillers or polymer additives, slip agents, plasticizers, processing aids, lubricants, viscosity control agents, tackifiers, antiblocking agents, surfactants, extender oils, metal deactivators, voltage stabilizers, flame retardant fillers, crosslinking agents, boosters, and catalysts, and smoke suppressants. Additives and fillers can be added in amounts ranging from less than about 0.1 to more than about 50 percent by weight based on the weight of the composition.

The IHFSPN polymer may be crosslinked or coupled to the base polymer, which itself can be crosslinked or uncrosslinked. The IHFSPN polymer may comprise 10 to 50 wt % based on the weight of the overall composition. More typically, the IHFSPN polymer may comprise 25 to 30 wt % based on the weight of the overall composition.

Examples of antioxidants are: hindered phenols such as tetrakis [methylene(3,5-di-tert-butyl-4-hydroxyhydrocinnamate)]methane, bis[(beta-(3,5-ditert-butyl-4-hydroxybenzyl)-methylcarboxyethyl)]sulphide, 4-4'-thiobis(2-methyl-6-tert-butylphenol), and thiodiethylene bis(3,5-ditert-butyl-4-hydroxyl)hydrocinnamate; phosphites and phosphonites such as tris(2,4-ditert-butylphenyl)phosphate and ditert-butylphenyl-phosphonite; thio compounds such as dilaurylthiodipropionate, dimyristylthiodipropionate, and distearylthiodipropionate; various siloxanes; and various amines such as polymerized-1,2-dihydro-2,2,4-trimethylquinoline, 4,4'-bis (alpha,alpha-demthylbenzyl)diphenylamine, and alkylated diphenylamines. Antioxidants can be used in amounts of about 0.1 to about 5 percent by weight based on the weight of the composition.

Processing aids may be included in the IHFSPN polymer composition for their known purposes. Thus, although processing aids are not necessary to achieve homogeneous blends and reduced viscosity, they may be added into the compositions of the present invention to further enhance these properties. For example, the processing aids may include, but are not limited to, polyethylene glycol, metal stearates such as zinc stearate and aluminum stearate, stearate salts, stearic acid, polysiloxanes, stearaminde, ethylene-bisoleyamide, ethylene-bisstearamide, silicon polymers, fluoropolymers, mixtures thereof and the like. Processing aids, when incorporated into compositions of the present invention, are generally used in amounts from about 0.1 to 5 percent by weight, based on the total weight of the IHFSPN polymer composition.

The IHFSPN polymer composition may contain a coupling agent and or crosslinking agent to improve the compatibility between the flame retardant and the base polymer. Examples of coupling agents or crosslinking agents include silanes, titanates, sircontates, various polymers grafted with maleic anhydride, maleic anhydrides grafts onto the copolymer, and mixtures thereof. The composition may include the coupling or crosslinking agent in an amount of from 0.5 to 5 percent by weight, based on the weight of the composition. An organic peroxide is preferably used as a free radical generator and crosslinking agent. Useful organic peroxide crosslinking agents include, but are not limited to, di(tert-buylperoxyisopropyl)benzene, dicumyl peroxide, di(tert-butyl) peroxide, and 2,5-dimethyl-2,5-di(tert-butylperoxy)-hexane. Known coagents may also be used in combination with the coupling or crosslinking agents. Organic peroxide crosslinking agents are disclosed in U.S. Pat. No. 3,296,189.

IHFSPN Based Articles

Articles manufactured from the IHRSPN polymer compositions of this invention include, but are not limited to, wire and cable coatings, films, foams, molds, coatings for electronic connectors, plastics for electronic housing, footwear, furniture, decoration, printed circuit boards, wind mill blades, thermal insulation for buildings, coatings for wood or steel structures, and adhesives. These articles can be made using known equipment and known methods, e.g., extrusion, molding, casting, etc.

Process of Manufacturing an IHFSPN Polymer

The synthesis of an IHFSPN polymer starts with the preparation of a silanediyldiamine and a spirodihalophosphate. The silanediyldiamine is synthesized from the reaction of 0.1 mole (mol) dichlorosilane and 0.025 mol diamine in the presence of 0.1 mol triethylamine (TEA) according to the following scheme:

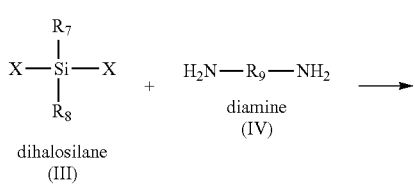

-continued

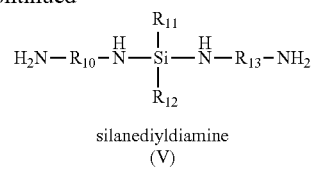

silanediyldiamine
(V)

where $R_7$ through $R_{13}$ may be the same or different from each other, and selected from: hydrogen, $C_1$-$C_5$ alkyl, $C_3$-$C_5$ hydroxyalkyl, $C_3$-$C_4$ alkenyl, $C_6$-$C_{10}$ aryl, $C_7$-$C_8$ arylalkyl, or a cycloalkyl structure (e.g., cyclohexyl); and X may be any halogen, typically chlorine.

Spirodihalophosphate is formed by the reaction of 0.2 mol dihalophosphate and 0.1 mol polydric alcohols. The reactants can be selected from dihalosilane, diamine, silanediyldiamine and dihalophosphate/phosphate/phosphonate. The structures are listed in the scheme below:

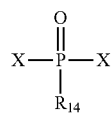

(VI)

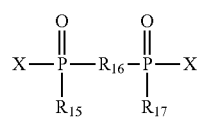

(VII)

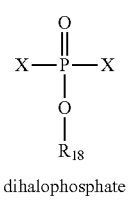

(VIII)

dihalophosphate

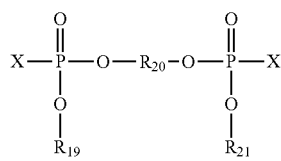

(IX)

where $R_{14}$ through $R_{21}$ may be the same or different from each other, and selected from: hydrogen, $C_1$-$C_5$ alkyl, $C_3$-$C_5$ hydroxyalkyl, $C_3$-$C_4$ alkenyl, $C_6$-$C_{10}$ aryl, $C_7$-$C_8$ arylalkyl, or a cycloalkyl structure (e.g., cyclohexyl); and X may be any halogen, typically chlorine.

An IHFSPN polymer is formed by reacting 0.1 mol silanediyldiamine and 0.1 mol dihalophosphate, in the presence of 0.2 mol of a tertiary amine. The temperature of the reactions may be from room temperature to about 200° C., dependent on the solvent used as one skilled in the art would recognize. A polymer of Formula (I) is formed by the scheme below:

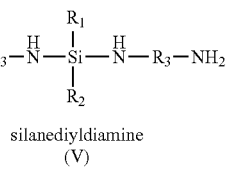

silanediyldiamine
(V)

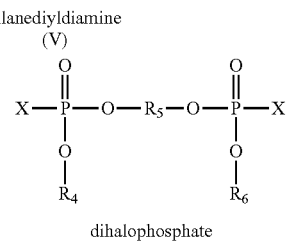

dihalophosphate
(IX)

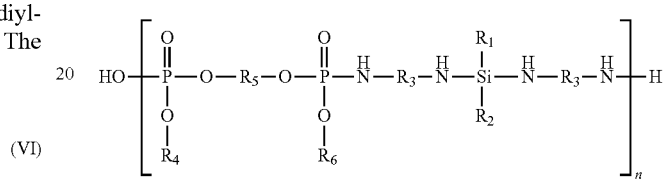

SPN based polymer
(I)

where $R_1$ through $R_6$, in the scheme above, may be the same or different from each other, and selected from: hydrogen, $C_1$-$C_5$ alkyl, $C_3$-$C_5$ hydroxyalkyl, $C_3$-$C_4$ alkenyl, $C_6$-$C_{10}$ aryl, $C_7$-$C_8$ arylalkyl, or a cycloalkyl structure (e.g., cyclohexyl); and X may be any halogen, typically chlorine.

Specific Embodiments

All materials and solvents are available from Sinopharm Chemical Reagent Co., Ltd.

The synthesis of an IHFSPN polymer of Formula (II) starts with the preparation of N,N-(diphenylsilanediyl)diethane-1,2-diamine (DPSEA) and pentaerythritol-spirodichlorophosphate (PSDCP). The reaction of 0.1 mol dichlorodiphenyl silane and 0.025 mol ethane-1,2-diamine in the presence of 0.1 mol triethylamine (TEA) forms DPSEA. The reaction of 0.2 mol phosphoryl trichloride and 0.1 mol pentaerythritol forms PSDCP. 0.1 mol DPSEA reacts with 0.1 mol PSDCP, in the presence of 0.2 mol TEA, forming the IHFSPN polymer of Formula (II).

Synthesis of DPSEA

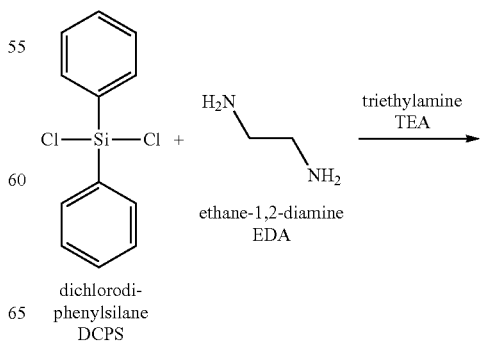

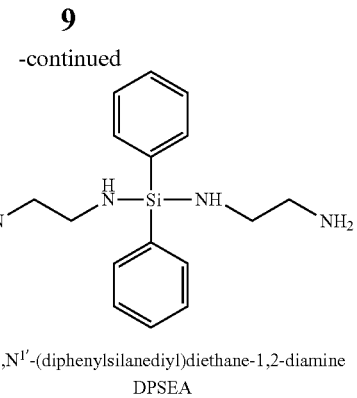

N¹,N¹'-(diphenylsilanediyl)diethane-1,2-diamine
DPSEA 6.18 g (0.1 mol) EDA and 10.1 g (0.1 mol) TEA dissolves in 20 ml dichloromethane in a three necked flask equipped with a reflux condenser, an over-head mechanical stirrer, a thermometer and an ice-water bath. Then, 6.33 g (0.025 mol) DCPS dissolves in 80 ml dichloromethane and is added dropwise into the flask under the dry nitrogen atmosphere. The reaction continues for 5-6 hours. Water washes the obtained mixture to remove unreacted TEA, EDA and triethylamine hydrochloride to obtain white powder. By the vacuum drying, the product is obtained at a yield of 92%.

Synthesis of PSDCP

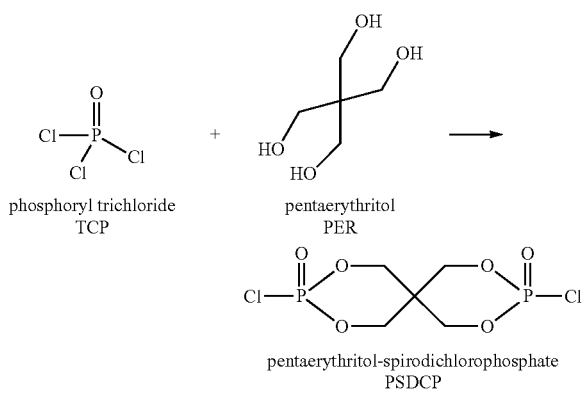

30.38 g (0.2 mol) TCP, 13.61 g (0.1 mol) PER and 0.05 g AlCl₃ combine in 250 ml MeCN in a three necked round bottom flask equipped with a reflux condenser, an over-head mechanical stirrer and a thermometer. The mixture heats to 80° C. and reacts for 7 hours. After reaction completion, the solvent evaporates to give a white powder. Cool water washes the powder, ethanol and dichloromethane, respectively. The product dries by vacuum drying in an oven at 50° C. for 5 hours to give 23.67 g product PSDCP (yield 80%).

Synthesis of the IHFSPN Polymer of Formula (II)

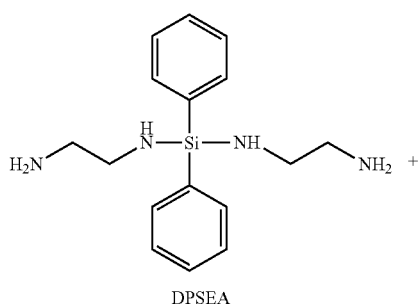

DPSEA

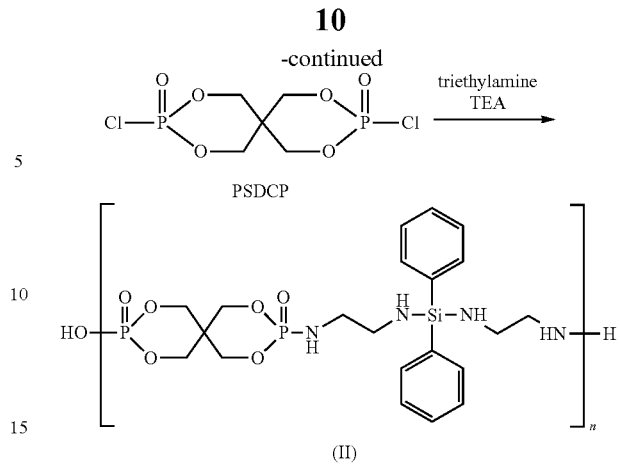

(II)

An Ubbelohde viscometer estimates the molecular weight of the example product to be 7000, corresponding to an "n" value of 13.

30.24 g (0.1 mol) DPSEA combines with into 100 ml N-Methyl-2-pyrrolidone (NMP) in a three necked flask equipped with a reflux condenser, an over-head mechanical stirrer and a thermometer. The mixture stirs under dry nitrogen atmosphere until the DPSEA dissolves completely at room temperature. Then 20.20 g (0.2 mol) TEA and 29.7 g (0.1 mol) PSDCP add into the reaction and the temperature of the reaction increases to 90° C. After 24 hours reaction, light yellow precipitate is obtained by filtration. Water washes the obtained solid and then the solid dries in a vacuum oven at 80° C. for 6 hours to give a polymer of Formula (II) (yield 94%).

Characterization of the IHFSPN Polymer of Formula (II)

The IHFSPN polymer of Formula (II) is not soluble in common solvents. The characterization is conducted through elemental analysis (according to ASTM D7455-08). The results are listed in Table 1.

TABLE 1

Elemental analysis results of the IHFSPN polymer of Formula (II)

| | Carbon (%) | Nitrogen (%) | Phosphorus (%) |
|---|---|---|---|
| Calculated | 48.1 | 12.4 | 11.4 |
| Found | 32.5 | 12.2 | 11.0 |

The element content is analyzed by gas composition generated from combusting the compound. The nitrogen and phosphorus contents are very close to the calculated contents. The tested carbon content is much lower than the calculated value, which is attributed to char forming during the combusting testing. Furthermore, triethylamine hydrochloride (a reaction byproduct) is detected by FTIR and NMR, which confirms the polycondensation reaction between the reactants. Therefore, the structure of an IHFSPN polymer of Formula (II) can be concluded.

Table 2 reports the composition and performance data for Comparative Examples 1-3 and Examples 1 and 2. Poly(Ethylene-Ethyl Acrylate) (EEA), such as EA103 available from The Dow Chemical Company, and ammonium polyphosphate (APP), such as Exolit AP 442 available from Clariant, are abbreviated in Table 2. All samples were compounded by HAKKE Rheocord system at 160° C. and 60 rpm. The compounds were then compression molded into test specimens with thickness of 3 millimeters (mm). Vertical burning experiment (UL94) was conducted by a ZCF-3 UL94 instrument using 125 mm×13 mm×3 mm bars according to ASTM D3801. Five test bars were used for this test. A compression molded plaque was prepared at a 185° C. molding temperature, using a low pressure cycle to facilitate melting, and then a high pressure to shape the 3×200×200 mm plaque and then the mold is held at high pressure (15 MPa) and cooled to room temperature over a period of 8 min to solidify the plaque.

TABLE 2

Example Formulations and UL94 Testing Results

| Formulations | C1 (wt %) | C2 (wt %) | C3 (wt %) | E1 (wt %) | E2 (wt %) |
|---|---|---|---|---|---|
| EEA | 75 | 68 | 60 | 75 | 68 |
| APP | 25 | 32 | 40 | 0 | 0 |
| IHFSPN Polymer of Formula (II) | 0 | 0 | 0 | 25 | 32 |
| t1/t2, s | — | 2/8 | 1/1 | 0/1 | 0/0 |
| t1/t2, s | 2/10 | 4/8 | 0/2 | 1/1 | 0/2 |
| t1/t2, s | 3/— | 6/12 | 1/1 | 0/5 | 2/2 |
| t1/t2, s | — | 8/10 | 0/2 | 1/1 | 0/2 |
| t1/t2, s | 8/— | 4/8 | 1/2 | 0/10 | 0/0 |
| Total | — | 70 | 11 | 20 | 8 |
| Rating | No rating | V1 | V0 | V0 | V0 |

The composition formulations in Table 2 of the Comparative Examples 1-3 and Examples 1 and 2 refer to poly(ethylene-ethyl acrylate) (EEA), and ammonium polyphosphate (APP).

Table 2 reports to the UL 94 standard classifications of plastic flammability. A Bunsen flame is applied to the bottom of the test specimen. The flame application time is 10 seconds. The first flaming time, t1, is the duration of the flame on the sample after the Bunsen flame is removed from the sample. After the first flame is extinguished, the Bunsen flame is applied again for 10 seconds and removed from the sample. The second flaming time, t2, is the duration of the flame on the sample after the Bunsen flame is removed until the flame on the sample is extinguished. Each flaming time should be no longer than 10 seconds for V0 rating, and 30 seconds for V1 or V2 ratings. The total flame time of three tested specimens should not be longer than 50 seconds for V0 rating and 250 seconds for V1 or V2 rating. Both V0 and V1 ratings cannot have dripping to ignite the cotton ball under the tested specimen while the V2 rating can have dripping. No rating is used for any test results which do not meet the V0, V1, or V2 rating.

As shown in Table 2, the inventive IHFSPN polymer composition at a loading level of 25% by weight only achieved UL94 V0 (Example 1). In contrast, the sample with 32% loading of APP in EEA achieved UL94 V1 and a 40% loading of APP in EEA achieved UL94 V0 (Comparative examples 1-3). Furthermore, samples with 40% loading of APP/MC (2/1) were burnt out with no rating in UL94. This result demonstrates that the inventive IHFSPN polymer composition comprising the IHFSPN polymer of Formula (II) affords better flame retardant performance at lower loading compared to the conventional APP and APP/MC based formulation.

Figure 2:
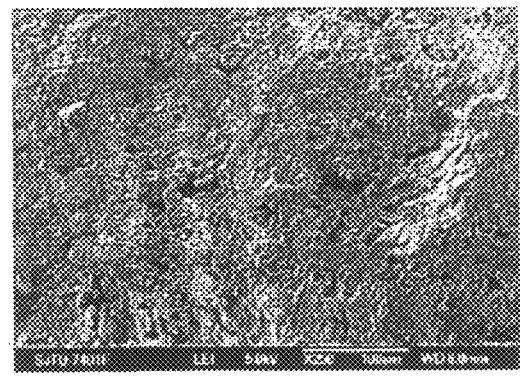
FIG. 2 is an SEM image of an EEA/Polymer of Formula (II) composite.

FIGS. 1 and 2 show the SEM images of the EEA/APP composite and the EEA/IHFSPN polymer of Formula (II) composite, both at 32% loading. As seen from the pictures, APP appears as big particles. However, the melting point of the IHFSPN polymer of Formula (II) is in the range of polymer processing temperatures (~160° C.), so a polymer of Formula (II) can become well dispersed in the polymer matrix. As a result, flame retardant compositions comprising an IHFSPN polymer of Formula (II) are expected to have no negative influence on the mechanical properties of the polymer matrix. Also the addition of an IHFSPN polymer of Formula (II) may help with the processing of the polymer matrix.

Although the invention has been described with certain detail through the preceding description of certain preferred embodiments, this detail is for the primary purpose of illustration. Many variations and modifications can be made by one skilled in the art without departing from the spirit and scope of the invention as described in the following claims.

The invention claimed is:

1. An intumescent, halogen-free, silicon-phosphorus-nitrogen (IHFSPN) polymer of Formula (I)

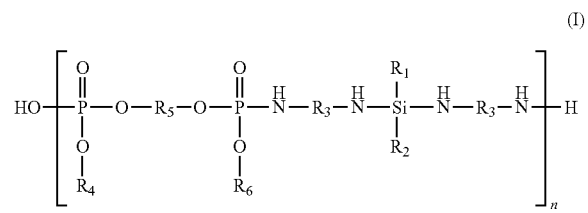

wherein "n" is 2 to 100 and $R_1$ through $R_6$, may be the same or different from each other, and selected from: hydrogen, $C_1$-$C_5$ alkyl, $C_3$-$C_5$ hydroxyalkyl, $C_3$-$C_4$ alkenyl, $C_6$-$C_{10}$ aryl, $C_7$-$C_8$ arylalkyl, or a cycloalkyl structure.

2. The IHFSPN polymer of claim 1, wherein "n" is 5 to 20.

3. An intumescent, halogen-free, silicon-phosphorus-nitrogen (IHFSPN) polymer of Formula (II)

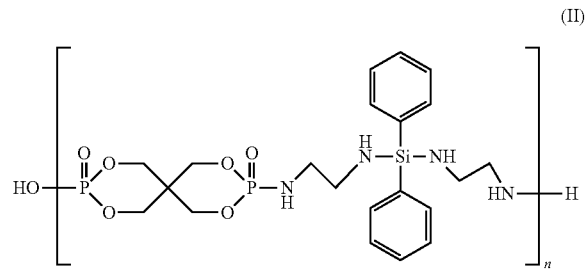

wherein "n" is 2 to 100.

4. A polymer flame retardant system comprising one or more IHFSPN polymers of claim 1.

5. The polymer flame retardant system of claim 4 further comprising at least one halogen-free flame retardant, wherein the halogen-free flame retardant is not a polymer of Formula (I).

6. The polymer flame retardant system of claim 5 wherein the halogen-free flame retardant is at least one of ammonium polyphosphate (APP), red phosphorus, silica, alumina, titanium oxides, carbon nanotubes, talc, clay, organo-modified clay, silicone polymer, zinc borate, antimony trioxide, wollastonite, mica, hindered amine stabilizers, ammonium octamolybdate, melamine octamolybdate, frits, hollow glass microspheres, intumescent compounds, expandable graphite, ethylene diamine phosphate, melamine phosphate, melamine pyrophosphate, and melamine polyphosphate.

7. A polymer composition comprising
a) a IHFSPN polymer of claim 1; and
b) a base polymer.

8. The composition of claim 7, wherein the base polymer comprises at least one of an epoxy ring, acid group, and anhydride group.

9. The composition of claim 7, wherein the polymer of Formula (I) is coupled to the base polymer.

10. The composition of claim 7, wherein the base polymer comprises at least one of an ethylene vinylacetate copolymer, a poly(ethylene-ethyl acrylate) copolymer, a thermoplastic polyurethane, a polyethylene and a polypropylene.

11. The composition of claim 7, comprising 10 to 50 weight percent of an IHFSPN polymer of Formula (I) and 50 to 90 weight percent of the base polymer.

12. The composition of claim 11, comprising 25 to 30 weight percent of an IHFSPN polymer of Formula (I) and 70 to 75 weight percent of a poly(ethylene-ethyl acrylate).

13. An article comprising a IHFSPN polymer of claim 1.

14. The article of claim 13 in the form of a cable coating.

15. The article of claim 13 in the form of a film.

16. A process of synthesizing an IHFSPN polymer comprising the steps of:
   (i) contacting at reaction conditions a dihalosilane and a diamine to form a silanediyldiamine;
   (ii) contacting at reaction conditions a dihalophosphate and a polydric alcohol to produce a spirodihalophosphate; and
   (iii) contacting at reaction conditions the silanediyldiamine and the spirodihalophosphate to produce an IHFSPN polymer of claim 1.

17. A process of synthesizing an IHFSPN polymer comprising the steps of:
   (i) contacting at reaction conditions a dihalosilane and a diamine to form a silanediyldiamine;
   (ii) contacting at reaction conditions a dihalophosphate and a polyhydric alcohol to produce a spirodihalophosphate; and
   (iii) contacting at reaction conditions the silanediyldiamine and the spirodihalophosphate to produce an IHFSPN polymer of claim 3; wherein
   the dihalosilane is dichlorodiphenylsilane,
   the diamine is ethane-1,2-diamine,
   the silanediyldiamine is N,N-(diphenylsilanediAdiethane-1,2-diamine,
   the dihalophosphate is phosphoryl trichloride,
   the polyhydric alcohol is pentaerythritol,
   the spirodihalophosphate is pentaerythritol-spirodichlorophosphate.

18. The process of claim 17, comprising the steps of:
   (i) contacting at reaction conditions 0.025 mol dichlorodiphenylsilane and 0.1 mol of ethane-1,2-diamine in the presence of 0.1 mol triethylamine to form N,N-(diphenylsilanediyl)diethane-1,2-diamine;
   (ii) contacting at reaction conditions 0.2 mol phosphoryl trichloride and 0.1 mol pentaerythirtol to produce pentaerythritol-spirodichlorophosphate; and
   (iii) contacting at reaction conditions 0.1 mol N,N-(diphenylsilanediyl)diethane-1,2-diamine and 0.1 mol pentaerythritol-spirodichlorophosphate to produce the IHFSPN polymer of Formula (II).

* * * * *